US008676673B2

(12) United States Patent
Shirazi

(10) Patent No.: US 8,676,673 B2
(45) Date of Patent: Mar. 18, 2014

(54) AQUA INDEX

(75) Inventor: Yaakov Shirazi, Petach Tikva (IL)

(73) Assignee: Aqua Index, Petach Tikva (IL)

( * ) Notice: Subject to any disclaimer, the term of this patent is extended or adjusted under 35 U.S.C. 154(b) by 208 days.

(21) Appl. No.: 13/209,547

(22) Filed: Aug. 15, 2011

(65) Prior Publication Data
US 2011/0295738 A1 Dec. 1, 2011

Related U.S. Application Data

(62) Division of application No. 12/194,551, filed on Aug. 20, 2008, now Pat. No. 8,024,239.

(60) Provisional application No. 60/956,933, filed on Aug. 21, 2007.

(51) Int. Cl.
G07B 17/00 (2006.01)
G07F 19/00 (2006.01)
G06Q 40/00 (2012.01)
G06Q 20/10 (2012.01)
G06Q 40/02 (2012.01)
G06Q 40/04 (2012.01)
G06Q 40/06 (2012.01)

(52) U.S. Cl.
CPC ............... G06Q 20/10 (2013.01); G06Q 40/00 (2013.01); G06Q 40/02 (2013.01); G06Q 40/04 (2013.01); G06Q 40/06 (2013.01); G06Q 40/10 (2013.01)
USPC ............... 705/30; 705/28; 705/35; 705/36 R; 705/37; 705/39

(58) Field of Classification Search
CPC ....... G06Q 40/10; G06Q 40/02; G06Q 40/00; G06Q 40/06; G06Q 40/04; G06Q 20/10
USPC .......................... 705/28, 30, 35, 36 R, 37, 39
See application file for complete search history.

(56) References Cited

U.S. PATENT DOCUMENTS

| 4,344,847 | A  | * | 8/1982 | Grenet ........................... 203/11 |
| 5,818,045 | A  | * | 10/1998 | Mark et al. ................ 250/339.12 |
| 6,950,806 | B2 | * | 9/2005 | Dines et al. ..................... 705/37 |
| 7,505,921 | B1 | * | 3/2009 | Lukas et al. ................ 705/26.5 |
| 7,520,667 | B2 | * | 4/2009 | Pahlsson et al. ................ 374/45 |
| 7,771,684 | B2 | * | 8/2010 | Constantz et al. ............ 423/220 |
| 8,024,239 | B2 | * | 9/2011 | Shirazi ............................ 705/30 |
| 2001/0034663 | A1 |  | 10/2001 | Teveler et al. |
| 2002/0062594 | A1 | * | 5/2002 | Erickson ........................ 47/48.5 |
| 2002/0188459 | A1 | * | 12/2002 | Erickson ........................... 705/1 |

(Continued)

OTHER PUBLICATIONS

Cohen, H. D., & Golub, K. L. (1996). Valuation of potable water east of the mississippi river. The Appraisal Journal, 64(3), 279. Retrieved from http://search.proquest.com/docview/199930632?accountid=14753.*

(Continued)

Primary Examiner — Olusegun Goyea
(74) Attorney, Agent, or Firm — Mark M. Friedman

(57) ABSTRACT

A method and system for computing a stable index value of a regulated substance by computing a virtual value of the substance based on the value of a freely marketed product of the substance. Particularly the invention may be applied to develop a stable investment instrument for investing in fresh water.

42 Claims, 4 Drawing Sheets

(56) References Cited

U.S. PATENT DOCUMENTS

| | | | | |
|---|---|---|---|---|
| 2003/0014342 | A1* | 1/2003 | Vande Pol | 705/36 |
| 2004/0088224 | A1 | 5/2004 | Mukai | |
| 2004/0181528 | A1* | 9/2004 | Tirinato et al. | 707/8 |
| 2004/0199451 | A1* | 10/2004 | Benning et al. | 705/37 |
| 2005/0246271 | A1* | 11/2005 | Erwin | 705/39 |
| 2006/0085152 | A1* | 4/2006 | Sugiyama et al. | 702/81 |
| 2007/0050278 | A1* | 3/2007 | Steidlmayer et al. | 705/37 |
| 2007/0055608 | A1* | 3/2007 | Steidlmayer et al. | 705/37 |
| 2007/0078790 | A1* | 4/2007 | Kalyan | 705/80 |
| 2007/0265523 | A1* | 11/2007 | Pahlsson et al. | 600/412 |
| 2008/0059358 | A1* | 3/2008 | Wardley et al. | 705/37 |
| 2008/0306861 | A1* | 12/2008 | Fell et al. | 705/37 |
| 2008/0313014 | A1* | 12/2008 | Fell et al. | 705/10 |
| 2009/0063362 | A1* | 3/2009 | O'Connell et al. | 705/36 R |
| 2009/0063364 | A1* | 3/2009 | O'Connell et al. | 705/36 R |
| 2009/0119200 | A1* | 5/2009 | Riviere | 705/37 |
| 2009/0132411 | A1* | 5/2009 | Drouin et al. | 705/37 |
| 2009/0132434 | A1* | 5/2009 | Drouin et al. | 705/36 R |
| 2009/0248561 | A1* | 10/2009 | McIntosh | 705/35 |
| 2010/0023340 | A1* | 1/2010 | Chowdhary et al. | 705/1 |
| 2010/0063902 | A1* | 3/2010 | Constantz et al. | 705/28 |
| 2010/0121755 | A1* | 5/2010 | Spurgin et al. | 705/37 |

OTHER PUBLICATIONS

American stock exchange publishes new palisades water index. (Aug. 11, 2005). PR Newswire. Retrieved from http://search.proquest.com/docview/451395282?accountid=14753.*

Deutsch, C. H. (Aug. 10, 2006). Global demand for clean water attracts companies big and small. New York Times. Retrieved from http://search.proquest.com/docview/433386095?accountid=14753.*

Aytemiz, L. (2001). The optimal joint provision of water for irrigation and hydropower in the euphrates river: The case of conflict between turkey and syria. (Order No. 3040854, Oklahoma State University). ProQuest Dissertations and Theses, , 175-175 p. Retrieved from http://search.proquest.com/docview/275892210?accountid=14753. (275892210).*

Zhao, J., Liu, W., & Deng, H. (2005). The potential role of virtual water in solving water scarcity and food security problems in china. International Journal of Sustainable Development and World Ecology, 12(4), 419-428. Retrieved from http://search.proquest.com/docview/198048614?accountid=14753.*

Xiang, X., Zhou, X., & Zhou, J. (2006). Study of virtual water calculation method of industrial products. Journal of Dalian University of Technology, 46(2), 179-184. Retrieved from http://search.proquest.com/docview/289916394?accountid=14753.*

William Pentland "Inventing Water's Future", published by Forbes. Com Jun. 19, 2008.

Paul Van Hofwegen "Task Force on Financing Water for All", published in http://www.worldwatercouncil.org/fileadmin/Financing_water_for_all/Reports/Financing_FinalText_Cover.pdf, Mar. 2006.

Saijel Kishanand Madelene Pearson (Jun. 26, 2006). As need grows, value of water flows uphill Marketplace by Bloomberg :[3 Edition]. International Herald Tribune, p. 15 Retrieved May 24, 2011, from ProQuest Newsstand. (Document ID: 106624996.

Eric Uhlfelder. (Apr. 2006). Liquid assets. Institutional Investor, 106-107. Retrieved May 24, 2011, from ABI/INFORM Global. (Document ID: 1040671571 ).

ISE to Launch New Water Index. (Jan. 5, 2006). Business Wire, 1. Retrieved May 24, 2011, from Business Dateline. (Document ID: 958344731 ).

Edmund G Archuleta. "Financial practices in public utilities" in . American Water Works Association. Journal 92.1 (2000): 60-61. ABI/INFORM Trade & Industry, ProQuest. Web. Nov. 1, 2010.

Anthony DePalma. "Free Trade in Fresh Water? Canada Says No and Halts Exports. " New York Times Mar. 8, 1999, Late Edition (East Coast): Banking Information Source, ProQuest. Web. Nov. 1, 2010.

* cited by examiner

Figure 3

Global Data

|  | Export | Domestic | Desalinate | Bottled | purify | Food Crop | biofuels |
|---|---|---|---|---|---|---|---|
| symbol | Wa | Wq | Wu | Wh | Wi | Wt | Wb |
| portion | 0.05 | 0.5 | 0.0995 | 0.0005 | 0.05 | 0.2 | 0.1 |

Fresh Export

|  | Turkey | Canada | Norway |  |  |
|---|---|---|---|---|---|
| portion | 0.4 | 0.4 | 0.2 |  |  |
| price | $1.20 | $0.70 | $0.80 |  |  |
| w*a | 0.48 | 0.28 | 0.16 |  |  | value $0.92 domestic

|  | US city | Isreal | Russia | Mexico | Brazil |
|---|---|---|---|---|---|
| portion | 0.3 | 0.05 | 0.1 | 0.3 | 0.25 — 363a |
| price | $0.40 | $1.80 | $0.25 | $0.65 | $1.35 — 364a |
| w*q | 0.12 | 0.09 | 0.025 | 0.195 | 0.3375 | value $0.77 desalinate

|  | city | industr | vacation | u2 OPEC | u3 |
|---|---|---|---|---|---|
| portion | 0.2 |  | 0.5 | 0.3 |  — 363b |
| price | $0.80 |  | $1.50 | $4.00 |  — 364b |
| w*u | 0.16 |  | 0.75 | 1.2 |  | value $2.11 bottled

|  | store US | deliver US | store EEU |
|---|---|---|---|
| portion | 0.4 | 0.4 | 0.2 | — 363c |
| price | $200.00 | $150.00 | $300.00 | — 364c |
| w*h | 80 | 60 | 60 |  | value $200.00 purify

|  | city | industr | vacation | OPEC |
|---|---|---|---|---|
| portion | 0.5 |  | 0.25 | 0.25 | — 363d |
| price | $0.50 |  | $3.50 | $2.50 | — 364d |
| w.i | 0.25 |  | 0.875 | 0.625 |  | value $1.75

Food Crops

|  | corn NY t1 | coffee t2 | wheat NY t3 |
|---|---|---|---|
| portion | 0.27 | 0.5 | 0.23 | — 363e |
| price | $0.20 | $0.15 | $0.30 | — 364e |
| w*t | 0.054 | 0.075 | 0.069 |  | virtual value $0.20 — 365a

Biofuels

|  | ethanol b1 | biodiesel b2 | biomethane b3 |
|---|---|---|---|
| portion | 0.5 | 0.3 | 0.1 | — 363f |
| price | $0.22 | $0.15 | $0.43 | — 364f |
| w*t | 0.132 | 0.045 | 0.043 |  | virtual value $0.22 — 365b

Total

|  | Fresh Expc | domestic | desalinate | bottled | purify | food crops | biofuels |
|---|---|---|---|---|---|---|---|
| portion | 0.05 | 0.5 | 0.0995 | 0.0005 | 0.05 | 0.2 | 0.1 |
| value | $0.92 | $0.77 | $2.11 | $200.00 | $1.75 | $0.20 | $0.22 |
| w*x | 0.046 | 0.38375 | 0.209945 | 0.1 | 0.0875 | 0.0396 | 0.022 |

$0.89 — 366    N    0.01    D    0.03    E    -0.015

$0.91 — 367    X 1.05

$0.96

$1.07 — 369    Z 1.12

368

AQUA INDEX

PRIORITY INFORMATION

This nonprovisional U.S. patent application claims the benefit of and priority to and is a continuation patent application of U.S. patent application Ser. No. 12/194,551 filed by inventor/applicant Yaakov Shirazi on 20 Aug. 2008 which has issued as U.S. Pat. No. 8,024,239 on Sep. 20, 2011.

FIELD AND BACKGROUND OF THE INVENTION

Various methods and systems for investing in commodities are possible, and particularly, methods and systems may determine of a stable index price and permit the use of a commodity as an investment for financiers and permit the holder of the commodity to generate capital to develop the commodity.

Many investors choose to invest in commodities as a hedge against inflation. In order to make commodities investment more secure, many financiers prefer to invest in an indexed commodity. The index gives a composite representative price based on the price at multiple suppliers. This allows the investor to invest in the commodity without being exposed to local instabilities in the markets.

Particularly, fresh water, being an essential and irreplaceable commodity that is becoming scarcer, is a very desirable commodity for investment. Furthermore, investment money is also needed for building plants for acquiring, purifying and distributing water. On the other hand, the market for water is strongly affected by local factors and prices vary wildly from place to place. Also temporally, supply and demand for water may vary very wildly due to short-term events. Prices of water in the USA are from 0.16 to 1.35 usd/m3 in Germany 1.80 usd/m3, in Finland 0.50 usd/m3, and 4.00 usd/m3 for desalinated water in Saudi Arabia. Thus in order to invest safely in water an investor needs additional protection.

In many water rich areas, water is not developed and squandered because although water is a very valuable commodity, water has no market value and cannot currently be sold, exploited or used as security for loans. Therefore water holders (e.g. regional governments or landholders having water resources) often choose to develop industries that provide quick profits even when these industries destroy valuable water resources. If a world water market were developed, water resources would become a valuable asset useful as for guaranteeing loans and this would encourage improved protection of water resources. Furthermore, developing a water market would make it possible for water holders to generate investment capital necessary to develop water resources.

A major problem in developing an integrated market for water is connected to the highly regulated nature of water as a commodity. The political and economic importance of water limits the potential of trade as a policy tool to mitigate water scarcity. National and local governments use exit fees, fixed taxing and progressive taxing of water on one hand, and subsidization of water on the other hand to protect local water supplies or encourage water intensive industries (like agriculture). Having a wide range of prices (e.g. 0.16-4.00 usd/m3) and exit fees (e.g. 0-70% in different provinces in Australia), and tax rates (e.g. 10-50% progressive tax and 30% subsidization for agriculture in Israel), no one has been able to build a stable international market for water.

This has created a situation in which, although fresh water is recognized as a commodity by the European Court and although fresh water is an essential commodity with limited supply and increasing demand (and thus a desirable investment [for example see the article "Inventing Water's Future" published by Forbs.com Jun. 19, 2008 by William Pentland]), and although there is a great need for investment capital to develop water resources [for example see World Water Council, World Water Forum Task Force on Financing Water for All, Report 1, by Paul Van Hofwegen, 2006] no one has been able to build a stable investment instrument for water. There is no integrated world market for water as there is for publicly traded commodities like wheat, corn, oil or gold. There is no investment instrument based on water price (S & P using 50 companies value). There is no public trading of a water index or water futures or water as a commodity on any major stock exchange.

There is thus a widely recognized need for, and it would be highly advantageous to have an investment instrument for water that is based on a stable free market price.

SUMMARY OF THE INVENTION

Various methods and systems are possible for providing an investment instrument and method for a investing. Particularly, a system or method may facilitate investment in a substance by determining a free market price of the substance based on a virtual value of the substance as the value is reflected in the price of a freely traded product.

An embodiment of an instrument for stable investment (a financial instrument may include for example a bond, a certificate, a futures, a stock, a basket) in a commodity may include a collateral having a valuable substance. The instrument may further include a virtual value of the substance calculated according to an influence of a price of the substance on the price of the product.

In an embodiment of an investment instrument the valuable substance may be regulated such that a price of the substance in trading is strongly affected by non-market factors (such as government subsidies, unusual taxes [e.g. excise taxes, fixed taxes, progressive taxes and export fees] or controls) while the product from which the virtual value is calculated may be a publicly traded commodity with a free market price.

In an embodiment of an investment instrument the substance of value in the collateral may be fresh water.

In an embodiment of an investment instrument the virtual value is calculated from one or more of an agricultural commodity, a manufactured commodity and a fuel (for example a biofuel).

In an embodiment of an investment instrument the virtual value of the substance may further depend on one or more of the following factors: the quantity of the substance in the product, the quantity of the substance utilized to produce the product, and the quantity of an output produced from the product (for example the quantity of energy output from combusting the product, a quantity of the substance produced as a byproduct of utilizing the product).

In an embodiment of an investment instrument the virtual value may further on a market weight of the product.

An embodiment of a method of investing may include calculating an index value of a substance. The index value may be at least partially dependent on a virtual value of the substance. The virtual value may be computed based on the influence of the value of the substance on the price of a product of the substance.

An embodiment of a method of investing may further include acquiring a right to a collateral containing the substance according to the index value of the substance.

In an embodiment of a method of investing, trade may be regulated in the substance for which the index price is calculated whereas the product from which the virtual price is calculated may be a publicly traded commodity.

In an embodiment of a method of investing, the substance for which an index price is calculated may be fresh water.

In an embodiment of a method of investing, the product from which the virtual price is calculated may be one or more of the following an agricultural commodity, a manufactured commodity, and a fuel.

In an embodiment of a method of investing, calculating the index value may employ one or more of evaluating a quantity of the substance contained in the product, evaluating a quantity of the substance utilized to produce the product and evaluating a quantity of an output from the product.

An embodiment of a method of trading a collateral may include determining a market value of the collateral based on an index value of a substance of the collateral. The index value may be calculated using a formula that is at least partially dependent on a virtual value of the substance in a product.

An embodiment of a method of trading a collateral may further include marketing a right to the collateral according to the market value of the collateral.

In an embodiment of a method of trading a collateral, trade in the substance of the collateral may be regulated whereas the product used for calculation of the virtual value may be a publicly traded commodity.

In an embodiment of a method of trading a collateral, the substance of the collateral may be fresh water.

In an embodiment of a method of trading a collateral, the product may include one or more of an agricultural commodity, a manufactured commodity, and a fuel.

In an embodiment of a method of trading a collateral, the virtual value may further depend one or more of a quantity of the substance in the product, a quantity of the substance utilized to produce the product, and a quantity of an output from the product.

An embodiment of a system to manage an investment may include a memory configured to store a virtual value of a substance, and a processor. The processor may be configured for computing the virtual value of the substance in at least one product, and calculating an index value of the collateral. The index value of the substance may be partially dependent on the virtual value of the substance.

In an embodiment of a system to manage an investment the substance may be a regulated commodity and the product may be a freely traded commodity.

In an embodiment of a system to manage an investment the substance may be fresh water.

In an embodiment of a system to manage an investment the product may include one or more of an agricultural commodity, a manufactured commodity, and a fuel.

In an embodiment of a system to manage an investment the memory may be further configured to store one or more of the quantity of the substance in the product, the quantity of the substance utilized to produce the product, and the quantity an output from the product.

Terminology

The following terms are used in this application in accordance with their plain meanings, which are understood to be known to those of skill in the pertinent art(s). However, for the sake of further clarification in view of the subject matter of this application, the following explanations, elaborations and exemplifications are given as to how these terms may be used or applied herein. It is to be understood that the below explanations, elaborations and exemplifications are to be taken as exemplary or representative and are not to be taken as exclusive or limiting. Rather, the terms discussed below are to be construed as broadly as possible, consistent with their ordinary meanings and the below discussion.

Acquiring a right to a collateral means receiving entitlement to derive a benefit from the collateral.

Marketing a right to a collateral means conveying entitlement to benefit from the collateral in return for some payment or benefit.

A product of a substance is an item or material, associated with the utilization of the substance (for example the substance may be utilized in production of the product or in order to bring the item to market). (As a result, the cost of the product may be influenced by the cost of the substance. A substance may also be considered a product of itself).

The substance of a collateral is something of general value that can be derived from the collateral.

A virtual value of a substance is a value of the substance obtained by calculating the influence of the value of the substance on the cost of a product of the substance or the influence of the cost of the substance on the cost of a product that is a substitute for a commodity.

BRIEF DESCRIPTION OF THE DRAWINGS

Various embodiments of a method and system for investment are herein described, by way of example only, with reference to the accompanying drawings, where:

FIG. 3 is an illustration of a computation of a price index;

DESCRIPTION OF THE PREFERRED EMBODIMENTS

The principles and operation of a method and system for investment according to various embodiments may be better understood with reference to the drawings and the accompanying description.

Figure 1:
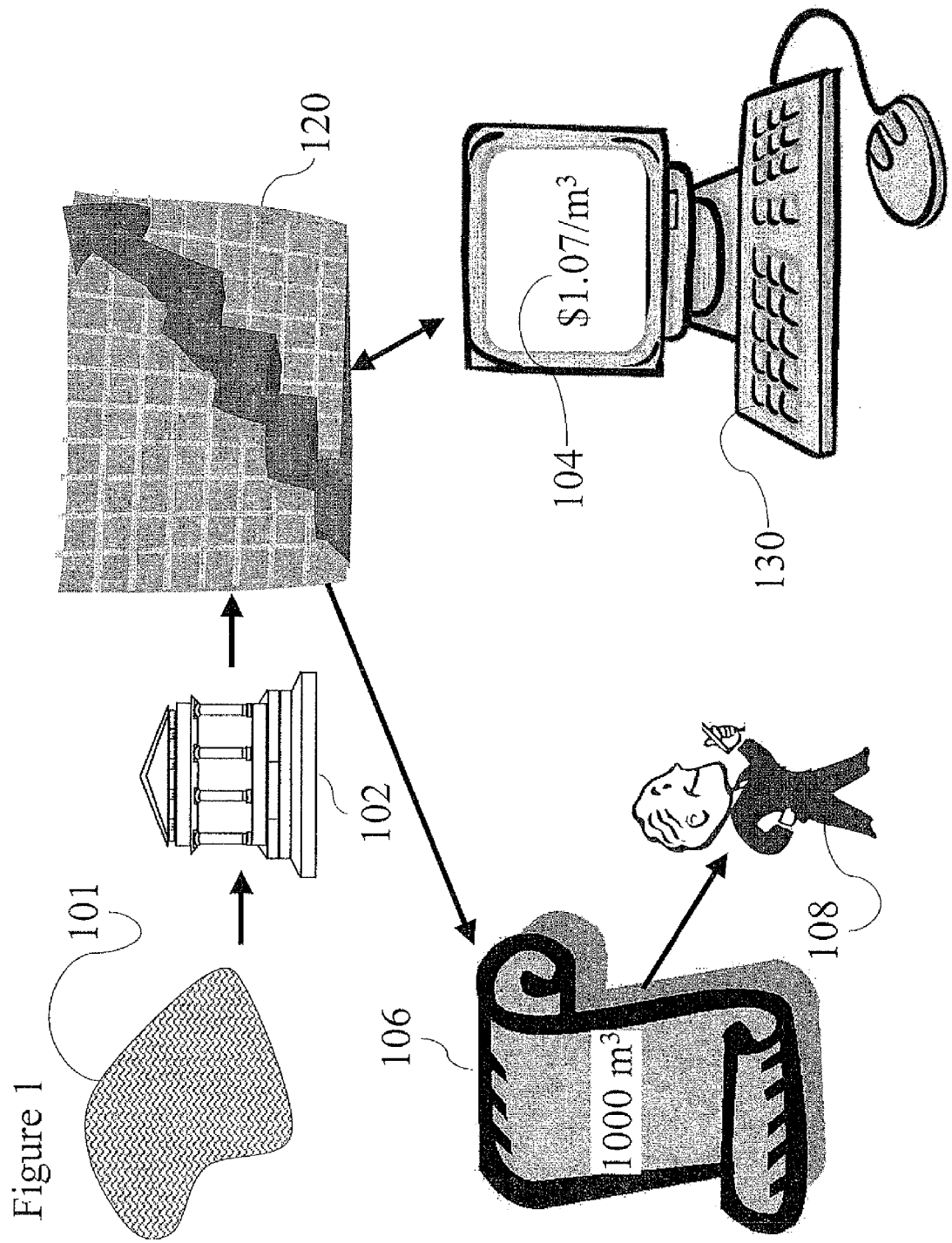
FIG. 1 is an illustration of an embodiment of an investment instrument.

Referring now to the drawings, FIG. 1 is an illustration of a financial instrument for investing in fresh water. Collateral 101 is a large body of fresh water owned by a municipality 102 (for example municipality 102 may be the state of Michigan and collateral 101 a lake). The substance of value in collateral 101 is fresh water. It will be understood to one skilled in the art, that although the water in collateral 101 has significant value and is easily available, nevertheless municipality 102 cannot be sell outright the water in collateral 101 due to legal limitations and limitations to pumping rates and the like. Nevertheless, Municipality 102 needs revenue and capital for development projects (including projects to protect or promote use of collateral 101 for example sewage treatment plants or building a marina or building a pumping station). Therefore municipality 102 markets water rights via a broker 120 and receives a commission as well as credits that can be used as security for loans.

The value of water in collateral 101 is difficult to evaluate because water trade is regulated by government legislation, licensing, official monopolies, taxes and subsidies. Therefore water is not freely marketable and has no consistent price. Therefore, broker 120 employs a standardized index 130, which is used to compute an index value 104 of water (for example $1.07/m^3$ as illustrated in the figure). In order to compute such a value broker 120 bases computations on the value of water in various localities as well as the virtual value of water in freely marketable products that contain water or utilize water in their production (examples are described herein below). Index values are stored in a memory of a desktop computer and calculated by the processor of the computer. Data for determining market shares and prices of products comes for statistics available over the Internet (for example statistics may be acquired from web sites associated with commodities markets, futures markets, stock exchanges [for example at N.Y., London, Tokyo]) and therefore can be updated easily in real time. Alternatively, statistics may be updated from periodically from published statistics or from statistics released from a government agency.

Broker 120 issues a certificate 106 (alternatively another financial instrument can be used for example a bond, a share, a stock, a future) for the water of collateral 101 and sells certificates 106 according to index value 104. In the example of FIG. 1, since index value 104 is $1.07/m$^3$ the broker 120 sells certificate 106 for 1000 m$^3$ for $1070 plus a 2% commission. An Investor 108 (who bought certificate 106) may redeem certificate 106 by requesting that municipality 102 deliver 1000 m$^3$ of water to investor 108 (investor 108 being responsible for transportation and handling cost), or investor 108 may hold onto certificate 106 assuming that index value 104 will rise and then investor 108 will sell certificate 106 to another investor (possibly via broker 120) and collect a profit (minus any brokerage charges).

Figure 2:
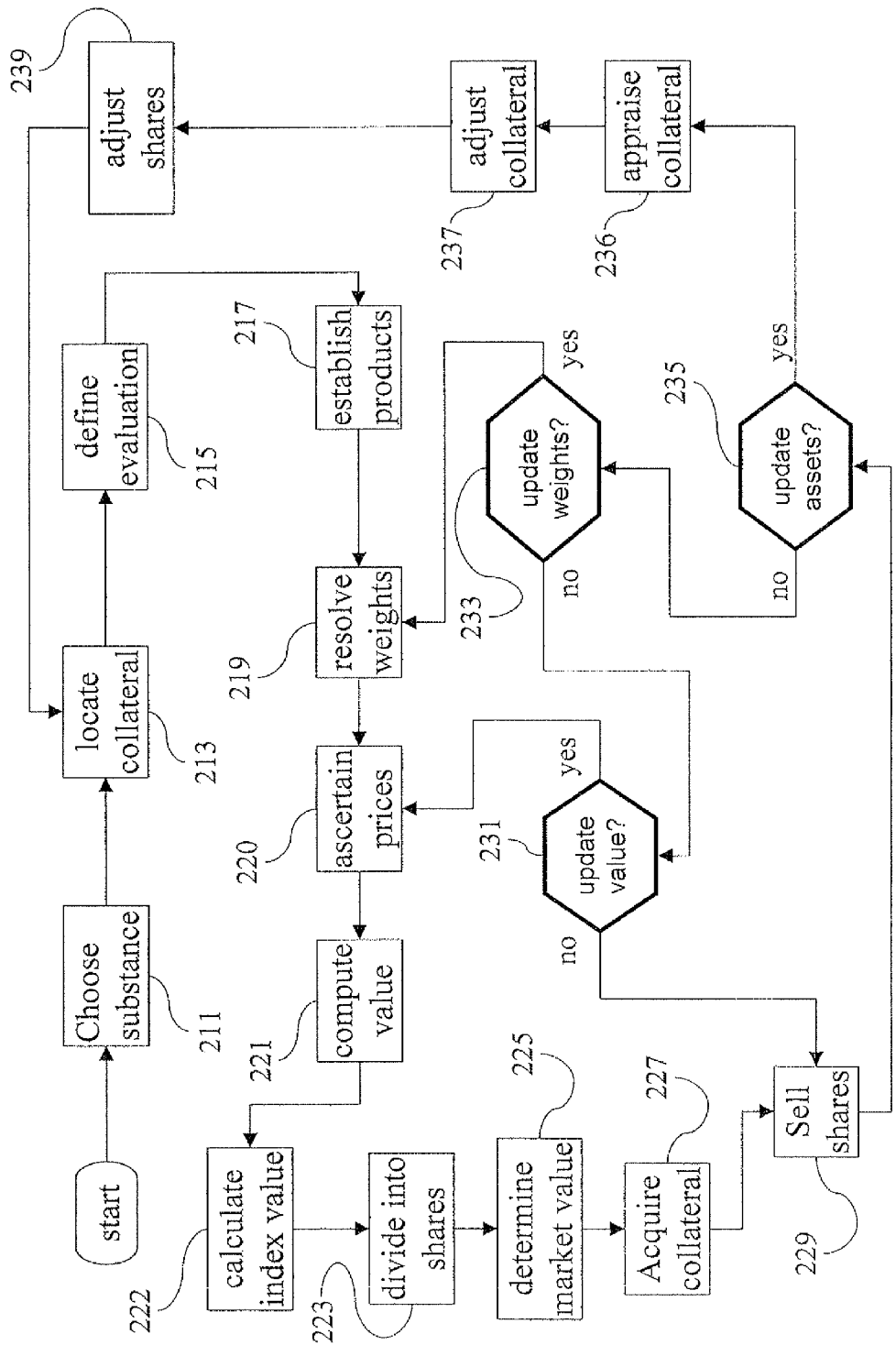
FIG. 2 is a generalized flowchart of a method of marketing a commodity.

FIG. 2 is a generalized flow chart of a method marketing a commodity. A broker searches for a resource that is under capitalized. For example there is a large quantity of fresh water available in the world and a need for the water but not enough capital to develop or even protect this resource. Therefore the broker chooses (block 211) to market fresh water. The broker must now locate (box 213) fresh water rights that can be acquired as collateral. In the example of FIG. 2 the broker finds that in Brazil there are a lot of natural lakes having large quantities of accessible water. Then it is necessary to define (box 215) a region of evaluation. For example it is possible to evaluate the water according to the value of water in Mexico and the Midwest United States (where there is a water shortage and water from the Amazon can easily be shipped) alternatively it is possible to evaluate the water according to the world price of water. The broker chooses to index fresh water according to the international value (worldwide) of water. Particularly, first the broker establishes (block 217) the main products of water in the world market and resolves (block 219) the weights for each product and ascertains (block 220) the price of each product and computes (box 221) the value of substance according to each product and calculates (box 222) an index value of the substance based on the compound price of the various products each weighted by its weight factor. An example of establishing (box 217) products resolving weights (box 219), ascertaining prices (box 220) computing a values (box 221) and calculating an index value (box 222) is illustrated hereinbelow in FIG. 3 and the accompanying description.

The broker then divides (box 223) the collateral into portions (for example a share which may be 1000 m3 of water, the collateral may be marketed using a share or another financial instrument as known in the art) and determines (box 225) a market value of each share according to the index value and the condition of the collateral (for example the price of the share may take into consideration the quality of the water in the lake or the location and accessibility of the water). For example if the index value is 1.07 usd/m3 and a share of the lake contains 1000 m3 then the market value of share may be 1070 usd. The broker then acquires (box 227) rights to market the collateral. For example the broker acquires (box 227) rights to the collateral by setting up a futures contract or supply contract with the municipality that owns a lake. Then the broker sells (box 229) shares to the collateral to an investor at the market value plus a commission.

The index value is sometimes updated. Particularly, periodically the algorithm checks (box 235) if it is time to update the state of the collateral (for example this may be done yearly or monthly or whenever there is a need to expand or adjust the index) if "yes" then a professional appraiser appraises (box 236) the collateral for the quantity, quality and availability of the water and the value of the collateral is adjusted (box 237) and then any new collateral necessary is located (box 213) the share certificates are adjusted (box 239) to make sure that each certificate is covered by valid assets and if necessary new collateral is located (box 213). If it is not time to adjust the collateral, ("no" in box 235) then the algorithm checks (box 233) if the time has comes to update the weights (Wx and Wx$_i$ [e.g. see FIG. 3 lines 362 and 363a4-f respectively]) (for example this may be done monthly or even daily). If "yes" then the weights are resolved (box 219) according to periodic reports of international trade organization of the quantity of trade of various goods in the world. If "no" then the algorithm checks (box 231) if the time has come to update product prices (e.g. see FIG. 3 lines 364a-f). If "yes" then the price of a product is ascertained (box 220). The price of a product may be updated, daily, hourly or in real time according to commodity prices available on the Internet or from other source. If "no" then trading continues (for example selling 229 rights to the collateral).

FIG. 3 shows the results of example calculations of the weights of products and values of a commodity. In the example of FIG. 3, eight products (water products) are chosen 211. For each water product (A, Q, U, H, I, B, T, and B: Export, Domestic, Desalinate, Bottled, purify, Food Crops and Biofuel) the product weights Wx (line 362) are the portion of the water market represented by that product. Then for each product one or more representative cases are chosen. For each representative case a case weight Wx$_i$ (lines 363a-f) is resolved and a case value x$_i$ (lines 364a-f) is ascertained respectively.

In the example of FIG. 3, the broker resolves 219 by looking up trade data that in the chosen region 5% of the water trade is for export (Wa=0.05) and 50% goes to domestic consumption (Wq=0.5) and 9.95% comes from desalinization (Wu=0.0995), 0.05% is bottled (Wh=0.0005), 5% is purified (Wi=0.05), 20% is included as virtual water in food crops (Wt=0.2) and 10% is included as virtual water for production of biofuels Wb=0.1. Thus, in the example, the index price of water 369 is partially (W$_t$+W$_b$=30%) dependent on a virtual price of water.

Alternatively, the calculations for the index value could also include virtual water used in manufactured products such as paper (where water is used to suspend the wood colloids and in cleaning and finishing processes).

Concerning the agricultural portion, water is utilized in production of agricultural commodities such as orange juice corn etc. Nevertheless, it would be difficult to include irrigation water in the index calculations because 1) much irrigation water is taken directly from natural sources (private wells/rivers/rain) and never accounted for 2) irrigation water is highly regulated and subsidized. Virtual water refers to the volume of water utilized for a product but not actually part of the product. Between 700-3500 liters of crop water are utilized to produce one kilo of cereal. Therefore, buying agricultural commodities essentially includes purchasing water. By including the virtual price of water in agricultural commodities the broker determines a price for water that is dependent upon market forces where there is little government involvement influencing the price. This enables the broker to build a stable market based index value 369 for water.

A global market weight factor W is resolved 219 for each product. More specifically in the example of FIG. 3, the global market weight factors Wa, Wq, Wu, Wh, Wi, Wt, and Wb (line 262) (in the example of FIG. 3 the market weights are the market portion of Export, Domestic, Desalinate, Bottled, purify, Food Crops, and Biofuels Respectively) are computed based on a fixed algorithm using available statistics.

Note that in the embodiment of FIG. 3 $Wt_1$, $Wt_2$, $Wt_3$, (line 263e) (the case weights of virtual water in each food crop) are based on the quantity of water physically contained (the quantity of water constituent in the product) in the commodity and not on the quantity of water utilized to produce the commodity. Thus for example a certain market includes in trade of food crops containing 1300 $m^3$ of water. In that trade there are 500,000 Kg wheat (wheat is 60% water and the density of water is 1000 $Kg/m^3$, thus 500,000 Kg wheat contains 500*0.6=300 $m^3$ of water). Then $Wt_3$=(500*0.6)/1300=0.23. Similarly the total water market (the sum of the water traded in all of the chosen water products) is 6500 m3 and the total water contained in traded food crops is 1300 m3. Thus the market weight of virtual water of agriculture in the index value of water is the portion of the total water market contained in food crops Wt=1300/6500=0.2

In the example of FIG. 3 the virtual value 365a of water in food crops is computed as follows:

The commodity corn price in N.Y. is 400 usd/ton; corn contains 75% water and utilizes 1500 m3 irrigation water/ton—

$t_1$=400*0.75/1500=0.2 usd/m3 is the virtual value of water in corn.

The commodity coffee price in N.Y. is 950 usd/ton, and coffee is 55% water and utilizes 3500 m3 irrigation water/ton. Thus—

$t_2$=950*0.55/3500=0.15 usd/m3 is the virtual value of water in coffee.

the commodity wheat price in N.Y. is 500 usd/ton; wheat contains 60% water and utilizes 1000 m3 irrigation water per ton—

$t_3$=500*0.6/1000=0.3 usd/m3 is the virtual value of water in wheat.

Taking into consideration each commodity case weights (line 363e) from the total traded agricultural commodities will give us the virtual value for water in food crops, which is the T price T=$Wt_1$*$t_1$+$Wt_2$*$t_2$+$Wt_3$*$t_3$=0.27*$0.2+0.5*$0.15+0.23*$0.3=0.20 usd/m3 365a. Thus the virtual price of water in agricultural food products T is dependent on the market weight of each agricultural food product, the market price of the agricultural food product and on the quantity of water utilized in production.

By including the virtual value of water in the index formula the broker computes a representative integrated value of water including the unregulated trade of water in other commodities (products).

Also in the example of FIG. 3, for the product desalinated water U, it is found that in the chosen evaluation region (the world water trade) 647 m3 which is 9.95% of the total water trade is desalinated water. 20% of the worlds desalinated water is used by industrial cities $Wu_1$=0.20 and the chosen representative case is Perth Australia which produces desalinated water at a cost of $u_1$=0.80 usd/$m^2$. 50% of desalinated water use in the world is in vacation areas and islands $Wu_2$=0.50 and the chosen representative case is Bermuda, which produces desalinated water at a price of $u_2$=1.50 usd/$m^3$. 30% of desalinated water use in the world is in oil exporting countries $Wu_3$=0.30 and the chosen representative case is Saudi Arabia, which produces desalinated water at a price of $u_3$=4.00 usd/$m^3$. The weights are updated monthly while the representative prices are updated weekly. Thus the value for desalinated water U=$Wu_1$*$u_1$+$Wu_2$*$u_2$+0.2*$0.80+0.5*$1.50+0.3*$4.00=2.11 usd/m3 368.

Virtual water included in bio-fuels is another part of the water trade. In the example of FIG. 3, the combined market weight of three bio-fuels is 10% of the total world trade of water Wb=0.1.

Many fuels like bio-diesel (produced from waste oils or oily plants and particularly algae), biomethane (produced by anaerobic digestion of organic waste) and ethanol (produced from fermentation of cellulous waste or grain) contain no appreciable water. Therefore the water content of the fuel is not used to compute the weight factor Wb. Two examples of alternative bases of Wb are the total mass/volume of the biofuel or the quantity of water output from combustion of the bio-fuel. For liquid fuels (like bio-diesel and ethanol) the total volume or mass of the bio-fuels can used to compute the weight factor Wb. Alternatively for any bio-fuel and particularly for a gas (for example methane) where the volume and weight are not comparable to the water content or total volume of a liquid fuel, the mass of water output in combustion products may be used to compute Wb (alternatively for bio-fuel Wb could be based on the energy output by combustion of the fuel or some other combustion product or constituent [e.g. carbon] of the fuel multiplied by a proportionality factor). Thus the total market of bio-fuels includes 650 m3, which is treated as 10% of the total water trade 6500 m3. The volume of ethanol sold is 390 m3 ($Wb_1$=390/650=0.6) and the volume of bio-diesel sold is 260 m3 ($Wb_2$=195/650=0.3). In the example of FIG. 3 the quantity of the water market in biomethane (on which is based the weight factor $Wb_3$) is calculated based on the output of combustion of the methane. Use of combustion outputs to compute Wb can facilitate comparison between various biofuels that may have very different densities (alternatively energy production or carbon constituent other bases of comparison may be used). Particularly, in the example of FIG. 3 the market includes a trade of 38800 m3 of bio-methane. Methane has a density of 0.67 Kg/m3 at room temperature and burning 1 Kg of biomethane produces approximately 2.5 Kg of water. Therefore burning 38800 m3 of methane produces 38800*0.67*2.5/1000=65 m3 water. Thus $Wb_3$=65/650=0.1.

The virtual price of water in biofuel is based on the water input to production of the fuel. To produce 1 ton of ethanol from corn utilizes 3600 m3 of water and the price of ethanol is 800$/ton and thus the virtual value of water in ethanol is $b_1$=$800/3600=0.22 usd/m3. Similar calculations for biodiesel (where water is necessary for upkeep of algal ponds) give a virtual water value of $b_2$=0.15 usd/m3 water. In the example of FIG. 3 the virtual value of water in biomethane is based on the quantity of water utilized in production. The cost of methane is 3.00 usd/m3 and producing a m3 of biomethane utilizes 7.0 m3 of water (to keep the digester running) thus the virtual value of water in the bio-methane is $b_3$=3.0/7.0=0.43 usd/m3. Thus the combined virtual value of water in biofuel B is dependent on the market weight of each product (the total mass of the fuel or the water output in combustion of the fuel) and the quantity of water utilized in production of the fuel B=$Wb_1$*$b_1$+$Wb_2$*$b_2$+$Wb_3$*$b_3$=0.6*$0.22+0.3*$0.15+0.1*$0.43=0.22 usd/m3 365b.

Alternatively the $CO_2$ output from combusting the biofuel or the quantity of the carbon constituent in the biofuel could be used as a common basis of computing the weight factor of all the biofuels.

Once each product weight and the value of water in each product and class of products is computed the prices are multiplied by the respective weights giving a combined value. In the example of FIG. 3 the sum of $Wa*A+Wq*Q+Wu*U+Wh*H+Wi*I+Wt*T+Wb*B=0.05*0.92+0.5*0.77+0.0995*2.11+0.0005*200+0.05*1.75+0.2*0.198+0.1*0.22=0.89$ usd/m3 366. This price is adjusted by adding a transport cost $N=0.01$ usd/m3 (for example the average cost of shipping water from the water source to the distributor) and an exit fee cost $D=0.03$ usd/m3 (for example the average exit fee paid by water importers for taking water from other municipalities) and $E=-0.015$ usd/m3 the recycle rate (taking account of the fact that some waste water re-enters the distribution system [by percolating into groundwater/running off into rivers/or via engineered water reuse]) giving an adjusted price of 0.91 usd/m3 367. Finally the final price is found by multiplying the adjusted price by a supply and demand factor $Z=1.12$ (when there are a lot of sellers of water certificates and few buyers the price is adjusted up and vice versa when the sellers outnumber the buyers) and a waste factor (1.05) which takes into account the increase of price to the consumer due to the loss of water between the source and the consumer. Thus the index value of water in the example of FIG. 3 is 1.07 usd/m3 369.

Using index value 369 of FIG. 3 (described above) companies get securities or purchase of water contracts for the value of the water at the index value. A company distributes contracts in the form of water basket stocks based on the water index value. A company can enter into agreements with finance institutions or investments houses—distributing water basket stocks for their clients and getting agreeable commissions and securities from the trading.

Alternatively a virtual value of a substance can also be computed based on a cost of a commodity for which there exists a product of the substance that is a substitute for the commodity. For example, it is possible to compute a virtual price for water from the price of gasoline. Since ethanol is a substitute for gasoline and since a major part of the cost of ethanol production is water, then it is possible to compute a virtual price of water based on the price of gasoline. For example since the price of gasoline is $700/ton and ethanol is a substitute for gasoline and since one can produce 1 ton of ethanol from corn which utilizes 3600 m3 of water to grow, then the virtual value of water based on the price of gasoline is $700/3600=B=0.19$ usd/m3.

Figure 4:
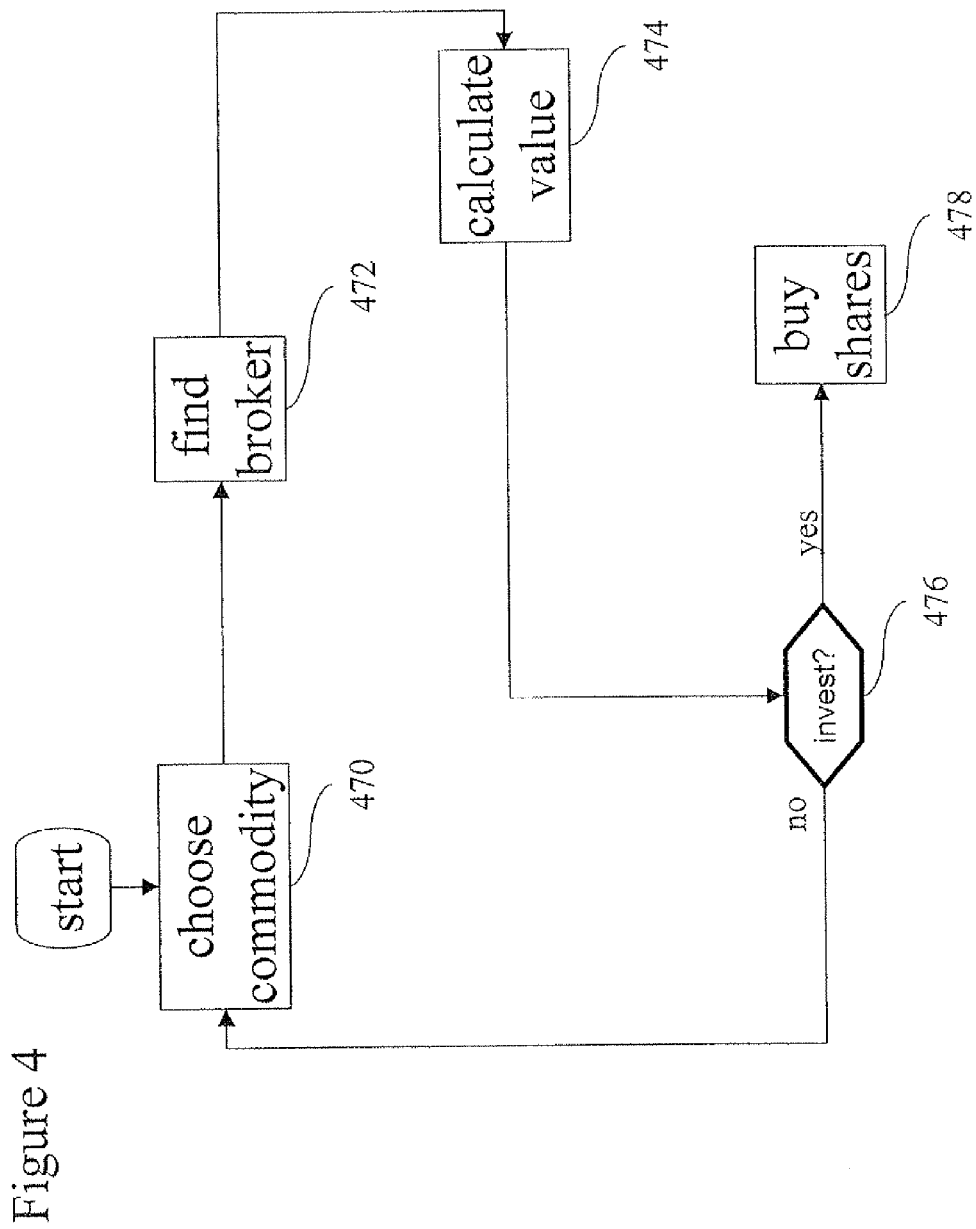
FIG. 4 is a generalized flowchart of a method of investing.

FIG. 4 is a flowchart illustrating a method of investing. An investor first chooses (box 470) a commodity (for example fresh water) in which to invest and then finds (box 472) a broker who is selling shares or other financial instrument (for example a bond, a certificate, a futures, a stock, a basket) in the commodity. Then the investor uses an index value to the commodity calculated (box 474) by the broker (for example index value 369 as described in FIG. 3 and the accompanying description). According to the calculated index value, the investor decides (box 476) whether to invest. If "yes" then the investor buys (box 478) shares from the broker. If "no" then the investor chooses (box 470) another commodity in which to invest.

In sum, although various example embodiments have been described in considerable detail, variations and modifications thereof and other embodiments are possible. Therefore, the spirit and scope of the appended claims is not limited to the description of the embodiments contained herein.

What is claimed is:

1. A system for trading water using financial instruments, each of the financial instruments identifying a particular amount of water, the price of the financial instruments determined by an index value of water applied to the particular amount of water and the particular amount of water, comprising:
    a processor configured to determine the index value of water applied to the particular amount of water based on a price of at least one tradable commodity other than water and based on one or more factors expressing an empirical relationship between a quantity of water and a quantity of the at least one tradable commodity,
    wherein the index value of water applied to the particular amount of water is determined by the processor using one or more mathematical operations to combine (i) the price of the at least one tradable commodity and (ii) the one or more factors expressing the empirical relationship between the quantity of water and the quantity of the at least one tradable commodity; and
    a display device configured to display the determined index value of water used in trading the particular amount of water using the financial instruments.

2. The system of claim 1, wherein the one or more factors comprise both (i) the quantity of the at least one tradable commodity and (ii) production of the quantity of the at least one tradable commodity.

3. The system of claim 1, wherein the one or more factors comprise at least one of (i) a quantity of water constituent in the quantity of the at least one tradable commodity and (ii) a quantity of water utilized in production of the at least one tradable commodity.

4. The system of claim 1, wherein the one or more factors comprise a quantity of water utilized to produce the quantity of the at least one tradable commodity.

5. The system of claim 1, wherein the one or more factors comprise a quantity of water constituent in the quantity of the at least one tradable commodity.

6. The system of claim 1, wherein the price of the at least one tradable commodity comprises a price of a first tradable commodity other than water and a price of a second tradable commodity other than water, and
    wherein the one or more factors comprise:
    a first weight assigned to the first tradable commodity,
    a second weight assigned to the second tradable commodity, and
    one of (i) a first amount of water utilized in production of a quantity of the first tradable commodity and a second amount of water utilized in production of a quantity of the second tradable commodity and (ii) a first amount of water utilized in production of the quantity of the first tradable commodity, a first amount of water constituent in the quantity of the first tradable commodity, a second amount of water utilized in production of the quantity of the second tradable commodity and a second amount of water constituent in the quantity of the second tradable commodity.

7. The system of claim 1, wherein the one or more factors comprise both (i) an amount of water constituent in a quantity of a particular tradable commodity of the at least one tradable commodity and (ii) an amount of water utilized in production of the quantity of the particular tradable commodity of the at least one tradable commodity.

8. The system of claim 1, wherein the one or more factors include a market weight of respective tradable commodities of the at least one tradable commodity.

9. A method of investing in water using financial instruments, each financial instrument identifying a particular amount of water, the price of each financial instruments determined by an index value of water applied to the particular amount of water and the particular amount of water, comprising:

determining, using a processor, the index value of water applied to the particular amount of water based on a price of at least one tradable commodity other than water and based on one or more factors expressing an empirical relationship between a quantity of water and a quantity of the at least one tradable commodity, wherein the index value of water applied to the particular amount of water is determined by the processor using one or more mathematical operations to combine the price of the at least one tradable commodity and the one or more factors expressing the empirical relationship between the quantity of water and the quantity of the at least one tradable commodity.

10. The method of claim 9, wherein the one or more factors comprise at least one of (i) the quantity of the at least one tradable commodity and (ii) production of the quantity of the at least one tradable commodity.

11. The method of claim 9, wherein the one or more factors comprise a quantity of water that is constituent in the quantity of the at least one tradable commodity.

12. The method of claim 9, wherein the one or more factors comprise a quantity of water utilized to produce the quantity of the at least one tradable commodity.

13. The method of claim 9, wherein the one or more factors comprise at least one of (i) an amount of water constituent in the quantity of the at least one tradable commodity and (ii) an amount of water utilized in production of the quantity of the at least one tradable commodity.

14. The method of claim 9, wherein the one or more factors comprise both (i) an amount of water constituent in the quantity of the at least one tradable commodity and (ii) an amount of water utilized in production, of the quantity of the at least one tradable commodity.

15. The method of claim 9, wherein the one or more factors comprise both (i) an amount of water constituent in a quantity of a particular tradable commodity of the at least one tradable commodity and (ii) an amount of water utilized in production of the quantity of the particular tradable commodity of the at least one tradable commodity.

16. The method of claim 9, wherein the one or more factors also comprise a market weight of respective tradable commodities of the at least one tradable commodity.

17. The method of claim 9, further comprising, using a display device, to display the determined index value of water used in trading the particular amount of water using the financial instruments.

18. A system for trading water using financial instruments, each of the financial instruments identifying a particular amount of water, the price of the financial instruments determined by an index value of water applied to the particular amount of water and the particular amount of water, comprising:

one or more processors configured to determine the index value of water applied to the particular amount of water based on a price of a first tradable product other than water, an amount of water utilized in production of a quantity of the first tradable product, a first weight assigned to the first tradable product, a price of a second tradable product other than water, an amount of water utilized in production of a quantity of the second tradable product and a second weight assigned to the second tradable product.

19. A method of using financial instruments to invest in water, comprising:

determining using one or more processors, a price of each of the financial instruments, each of the financial instruments identifying a particular amount of water, the price of each financial instrument determined using an index value of water applied to the particular amount of water and the particular amount of water; and determining, using the one or more processors, the index value of water applied to the particular amount of water based on a price of at least one tradable commodity other than water, and based on one or more factors expressing an empirical relationship between a quantity of water and a quantity of the at least one tradable commodity;

wherein the index value of water applied to the particular amount of water is determined by the one or more processors using one or more mathematical operations to combine the price of the at least one tradable commodity and the one or more factors expressing the empirical relationship between the quantity of water and the quantity of the at least one tradable commodity.

20. The method of claim 19, wherein the one or more factors comprise either (i) a quantity of water constituent in the quantity of the at least one tradable commodity, (ii) a quantity of water utilized to produce the quantity of the at least one tradable commodity, or (iii) a quantity of water constituent in the quantity of the at least one tradable commodity and a quantity of water utilized to produce the quantity of the at least one tradable commodity.

21. The method of claim 20, wherein the at least one tradable commodity includes an agricultural commodity.

22. The method of claim 19, wherein the index value of water applied to the particular amount of water is determined based also on a market weight of the at least one tradable commodity.

23. The method of claim 19, wherein the one or more factors comprise a quantity of an output of the at least one tradable commodity.

24. The method of claim 23, wherein the output is from combustion of the at least one tradable commodity.

25. The method of claim 19, further comprising issuing the financial instruments.

26. The method of claim 19, further comprising using the particular amount of water identified by the financial instrument as collateral.

27. The system of claim 6, wherein in the one or more mathematical operations, the first weight is applied to adjust a mathematical combination of: the price of the first tradable commodity and at least one of (i) the first amount of water utilized in production of the quantity of the first tradable commodity and (ii) the first amount of water utilized in production of the quantity of the first tradable commodity and the first amount of water constituent in the quantity of the first tradable commodity, and the second weight is applied to adjust a mathematical combination of the price of the second tradable commodity and at least one of (i) the second amount of water utilized in production of the quantity of the second tradable commodity and (ii) the second amount of water utilized in production of the quantity of the second tradable commodity and the second amount of water constituent in the quantity of the second tradable commodity.

28. The system of claim 18, further comprising:
a display device configured to display the determined index value of water used in trading the particular amount of water using the financial instruments.

29. The system of claim 28, wherein the index value of water applied to the particular amount of water is determined by the one or more processors using one or more mathematical operations to combine the price of the first tradable product, the amount of water utilized in production of the quantity of the first tradable product, the first weight assigned to the first tradable product, the price of the second tradable product, the amount of water utilized in production of the quantity of the second tradable product and the second weight assigned to the second tradable product.

30. The system of claim 29, wherein the one or more processors are further configured to determine the index value of water applied to the particular amount of water based on a price of a third tradable product other than water, an amount of water utilized to produce a quantity of the third tradable product and a weight assigned to the third tradable product.

31. The system of claim 28, wherein the respective prices of the first and second tradable products are not dependent on each other.

32. The system of claim 28, wherein the one or more processors are configured to determine the index value of water applied to the particular amount of water based also on an amount of water constituent in the quantity of the first tradable product and an the amount of water constituent in the quantity of the second tradable product.

33. A system for trading water using financial instruments, each of the financial instruments identifying a particular amount of water, the price of the financial instruments determined by an index value of water applied to the particular amount of water and the particular amount of water, comprising:
a processor configured to determine the index value of water applied to the particular amount of water based on a price of, and a weight assigned to, each of at least three tradable commodities other than water and based on, for each particular tradable commodity of the at least three tradable commodities, at least one of (i) an amount of water utilized in production of a quantity of the particular tradable commodity and (ii) an amount of water constituent in the quantity of the particular tradable commodity,
wherein the index value of water applied to the particular amount of water is determined by the processor using one or more mathematical operations to combine the price of, and the weight assigned to, each of the at least three tradable commodities other than water and, as to each of the at least three commodities, the at least one of (i) the amount of water utilized to produce the quantity of the particular tradable commodity and (ii) the amount of water constituent in the quantity of the particular tradable commodity.

34. The system of claim 33, further comprising
a display device displaying the determined index value of water used in trading the particular amount of water using the financial instruments.

35. A system for trading water using financial instruments, each of the financial instruments identifying a particular amount of water, the price of the financial instruments determined by an index value of water applied to applicable to the particular amount of water and the particular amount of water, comprising:
a processor configured to determine the index value of water applied to the particular amount of water based on a price of at least one tradable commodity other than water and based on at least one of (i) a quantity of water utilized in production of a quantity of the at least one tradable commodity and (ii) a quantity of water constituent in the quantity of the at least one tradable commodity,
wherein the index value of water applied to the particular amount of water is determined by the processor using one or more mathematical operations to combine the price of the at least one tradable commodity and the at least one of (i) the quantity of water utilized to produce the quantity of the at least one tradable commodity and (ii) the quantity of water constituent in the quantity of the at least one tradable commodity.

36. The system of claim 35, further comprising:
a display device configured to display the determined index value of water used in trading the particular amount of water using the financial instruments.

37. The system of claim 35, wherein the price of the at least one tradable commodity is the current price of the at least one tradable commodity.

38. The system of claim 1, wherein the price of the at least one tradable commodity is the current price of the at least one tradable commodity.

39. The method of claim 9, wherein the price of the at least one tradable commodity is the current price of the at least one tradable commodity.

40. The system of claim 18, wherein the price of the first and second tradable products is the current price of the first and second tradable products.

41. The method of claim 9, wherein the price of the at least one tradable commodity is the current price of the at least one tradable commodity.

42. The system of claim 33, wherein the price of each of the at least three tradable commodities is the current price of each of the at least three tradable commodities.

* * * * *

UNITED STATES PATENT AND TRADEMARK OFFICE
CERTIFICATE OF CORRECTION

PATENT NO. : 8,676,673 B2
APPLICATION NO. : 13/209547
DATED : March 18, 2014
INVENTOR(S) : Yaacov Shirazi Page 1 of 1

It is certified that error appears in the above-identified patent and that said Letters Patent is hereby corrected as shown below:

In the Claims:

Column 14:

Claim 35, line 12 should be corrected as follows:
Change:
-- mined by an index value of water applied to applicable to the --
to
"mined by an index value of water applied to the"

Signed and Sealed this
Seventeenth Day of June, 2014

Michelle K. Lee
*Deputy Director of the United States Patent and Trademark Office*